United States Patent
Mitsuma et al.

(10) Patent No.: US 10,983,716 B2
(45) Date of Patent: Apr. 20, 2021

(54) WRITING DATA TO TAPE MEDIUM

(71) Applicant: International Business Machines Corporation, Armonk, NY (US)

(72) Inventors: Shinsuke Mitsuma, Higashimurayama (JP); Tsuyoshi Miyamura, Yokohama (JP); Tohru Hasegawa, Tokyo (JP); Noriko Yamamoto, Tokyo (JP); Sosuke Matsui, Machida (JP)

(73) Assignee: International Business Machines Corporation, Armonk, NY (US)

(*) Notice: Subject to any disclaimer, the term of this patent is extended or adjusted under 35 U.S.C. 154(b) by 290 days.

(21) Appl. No.: 15/938,895

(22) Filed: Mar. 28, 2018

(65) Prior Publication Data

US 2019/0303030 A1    Oct. 3, 2019

(51) Int. Cl.
*G06F 3/06* (2006.01)

(52) U.S. Cl.
CPC .......... *G06F 3/0643* (2013.01); *G06F 3/0604* (2013.01); *G06F 3/0629* (2013.01); *G06F 3/0682* (2013.01)

(58) Field of Classification Search
None
See application file for complete search history.

(56) References Cited

U.S. PATENT DOCUMENTS

| | | | | |
|---|---|---|---|---|
| 5,347,653 | A * | 9/1994 | Flynn | G06F 16/219 707/695 |
| 2015/0127980 | A1 * | 5/2015 | Klein | G06F 16/113 714/15 |
| 2015/0149415 | A1 * | 5/2015 | Iwanaga | G06F 16/16 707/684 |
| 2015/0161161 | A1 * | 6/2015 | Iwanaga | G06F 16/13 707/634 |
| 2015/0254141 | A1 * | 9/2015 | Wertheimer | G06F 16/22 707/646 |
| 2015/0286535 | A1 | 10/2015 | Kushwah et al. | |
| 2016/0350016 | A1 * | 12/2016 | Amir | G06F 3/065 |
| 2017/0168735 | A1 | 6/2017 | Hasegawa et al. | |

* cited by examiner

*Primary Examiner* — Edward J Dudek, Jr.
*Assistant Examiner* — Ralph A Verderamo, III
(74) *Attorney, Agent, or Firm* — Zilka-Kotab, P.C

(57) ABSTRACT

A computer-implemented method for writing data to a tape medium, includes: writing a file of a first content to the tape medium; writing at least a part of the file of a second content to the tape medium, the second content being obtained by updating the first content; and writing an index including first metadata and second metadata to the tape medium, the first metadata being metadata of the file of the first content, the second metadata being metadata of the file of the second content.

20 Claims, 7 Drawing Sheets

FIG.4A

```
<ltfsindex version="2.0.0">
    ....
    <directory>
        <name>folderA</name>
        ....
        <contents>
            <file>
                <name>fileA</name>
                ....
                <extentinfo>
                    <extent>
                        <partition>b</partition>
                        <startblock>N</startblock>
                        <byteoffset>0</byteoffset>
                        <bytecount>P1</bytecount>
                        <fileoffset>0<fileoffset>
                    </extent>
                </extentinfo>
            </file>
        </contents>
    </directory>
    <directory>
        <name>.ltfs_file_history</name>
        ....
        <contents>
            <directory>
                <name>folderA</name>
                ....
            </directory>
        </contents>
    </directory>
</ltfsindex>
```

```
<ltfsindex version="2.0.0">
    ....
        <directory>
            <name>folderA</name>
            ....
            <contents>
                <file>
                    <name>fileA</name>
                    ....
                    <extentinfo>
                        <extent>
                            <partition>b</partition>
                            <startblock>N+5</startblock>       ⎫
                            <byteoffset>0</byteoffset>          ⎬ 122
                            <bytecount>Q2</bytecount>           ⎪
                            <fileoffset>0<fileoffset>          ⎭
                        </extent>                                    ⎫
                        <extent>                                     ⎪
                            <partition>b</partition>                 ⎪
                            <startblock>N</startblock>       ⎫       ⎬ 121
                            <byteoffset>Q1</byteoffset>      ⎬ 123   ⎪
                            <bytecount>P1-Q1</bytecount>     ⎪       ⎪
                            <fileoffset>Q2<fileoffset>       ⎭       ⎪
                        </extent>                                    ⎪
                    </extentinfo>                                    ⎭
                </file>
            </contents>
        </directory>
        <directory>                                                          ⎫
            <name>.ltfs_file_history</name>                                  ⎪
            ....                                                             ⎪
            <contents>                                                       ⎪
                <directory>                                                  ⎪
                    <name>folderA</name>                                     ⎪
                    ....                                                     ⎪
                    <contents>                                               ⎪
                        <file>                                               ⎪
                            <name>fileA.201802051010</name>                  ⎪
                            ....                                             ⎬ 131
                            <extentinfo>                                     ⎪
                                <extent>                                ⎫    ⎪
                                    <partition>b</partition>            ⎪    ⎪
                                    <startblock>N</startblock>     ⎫    ⎬ 132⎪
                                    <byteoffset>0</byteoffset>     ⎬133 ⎪    ⎪
                                    <bytecount>P1</bytecount>      ⎪    ⎪    ⎪
                                    <fileoffset>0<fileoffset>      ⎭    ⎪    ⎪
                                </extent>                               ⎭    ⎪
                            </extentinfo>                                    ⎪
                        </file>                                              ⎪
                    </contents>                                              ⎪
                </directory>                                                 ⎪
            </contents>                                                      ⎪
        </directory>                                                         ⎭
</ltfsindex>
```

120

WRITING DATA TO TAPE MEDIUM

BACKGROUND

The present invention relates to writing data to a tape medium.

Recently, various techniques have been known regarding writing data to a tape medium.

SUMMARY

According to an embodiment of the present invention, there is provided a computer-implemented method for writing data to a tape medium. The method includes writing a file of a first content to the tape medium. The method further includes writing at least a part of the file of a second content to the tape medium. The second content is obtained by updating the first content. The method further includes writing an index including first metadata and second metadata to the tape medium. The first metadata is metadata of the file of the first content, and the second metadata is metadata of the file of the second content.

According to another embodiment of the present invention, there is provided an apparatus for writing data to a tape medium. The apparatus includes a processor and a memory coupled to the processor. The memory includes program instructions. The program instructions are executable by the processor to cause the processor to perform the aforementioned method.

According to yet another embodiment of the present invention, there is provided a computer program product for writing data to a tape medium. The computer program product includes a computer readable storage medium having program instructions embodied with the computer readable storage medium. The program instructions are executable by a computer to cause the computer to perform the aforementioned method.

BRIEF DESCRIPTION OF THE DRAWINGS

FIGS. 4A and 4B depict examples of descriptions of indices according to the preferred exemplary embodiment.

DETAILED DESCRIPTION

Hereinafter, exemplary embodiments of the present invention will be described in detail with reference to the attached drawings.

It is to be noted that the present invention is not limited to these exemplary embodiments to be given below and may be implemented with various modifications within the scope of the present invention. In addition, the drawings used herein are for purposes of illustration, and may not show actual dimensions.

A linear tape file system (LTFS) is an open technique for accessing files on tape media as a file system. The LTFS will become more convenient if it has a function which enables backup of a file over plural versions to access both the file of a current version and the file of a past version simultaneously and easily.

On the other hand, the LTFS manages files on the tape media using an "index". The index includes metadata of the files such as positions and lengths of the files on the tape media to access the files quickly.

In view of this, these exemplary embodiments are configured such that, when a file of the first version is updated to the file of the second version, metadata of the file of the first version and metadata of the file of the second version are stored into an index. These exemplary embodiments enable access to both the file of the first version and the file of the second version by analyzing the index.

Note that the file of the first version serves as one example of the claimed file of the first content, and the file of the second version serves as one example of the claimed file of the second content. Further, the metadata of the file of the first version corresponds to the claimed first metadata, and the metadata of the file of the second version corresponds to the claimed second metadata.

First, a preferred exemplary embodiment will be described.

Figure 1:
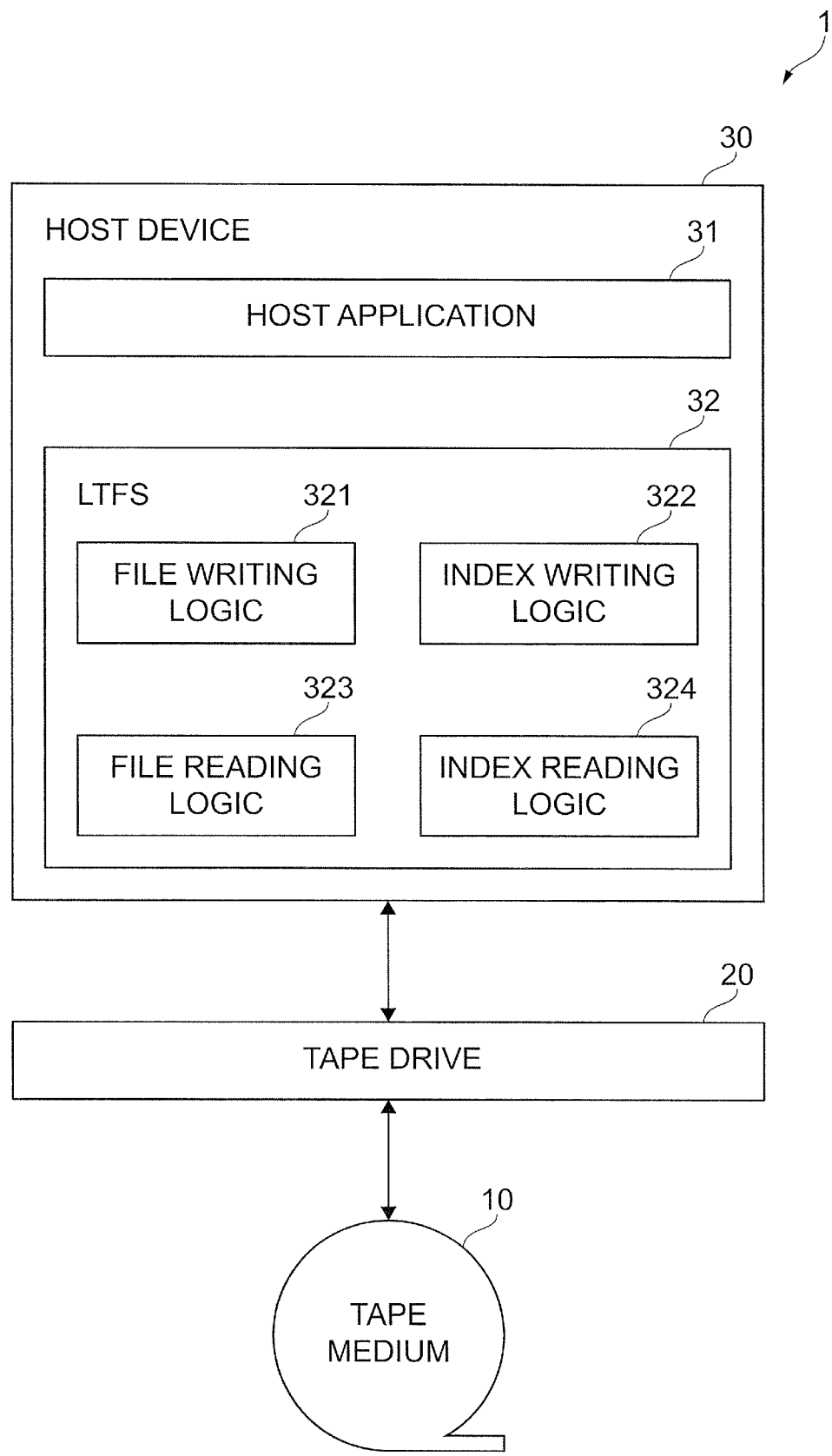
FIG. 1 depicts a block diagram of a tape system according to a preferred exemplary embodiment of the present invention.

Referring to FIG. 1, there is shown a block diagram of a tape system 1 to which the preferred exemplary embodiment is applied. As shown in the figure, the tape system 1 may include a tape medium 10, a tape drive 20, and a host device 30.

The tape medium 10 is a sequential access medium for storing data. That is, data is written to the tape medium 10 only additionally except the case where the tape medium 10 is reformatted. Note that, although one tape medium 10 is shown in the figure, the tape system 1 may include plural tape media. A magnetic tape medium may be used as the tape medium 10.

The tape drive 20 is a drive for writing data to the tape medium 10 and reading data from the tape medium 10. Specifically, the tape drive 20 may write data transmitted from the host device 30 to the tape medium 10, and read data to be transmitted to the host device 30 from the tape medium 10. Note that, although one tape drive 20 is shown in the figure, the tape system 1 may include plural tape drives.

The host device 30 is a computer device for performing processings using the tape medium 10. Specifically, the host device 30 may write files to the tape medium 10 by sending to the tape drive 20 the files to be written to the tape medium 10, and read files from the tape medium 10 by receiving from the tape drive 20 the files read from the tape medium 10. The host device 30 may include one or more host applications 31 and an LTFS 32. The host applications 31 may access files on the tape medium 10 via the LTFS 32. The LTFS 32 is a file system for the tape medium 10, as stated above, and may be a software-enhanced LTFS in the preferred exemplary embodiment. Specifically, the LTFS 32 may include a file writing logic 321, an index writing logic 322, a file reading logic 323, and an index reading logic 324.

The file writing logic 321 may write files to the tape medium 10. The files may include a file of an original version, and a file of a new version obtained by updating the file of the old version.

The index writing logic 322 may start periodically and write to the tape medium 10 an index including metadata of files of current versions and metadata of files of versions at the previous start.

The file reading logic 323 may read files from positions on the tape medium 10 indicated by the index.

The index reading logic 324 may read the index from the tape medium 10, for example, in response to a request for a display of a file for comparing the file of a current version and the file of a past version.

Figure 2:
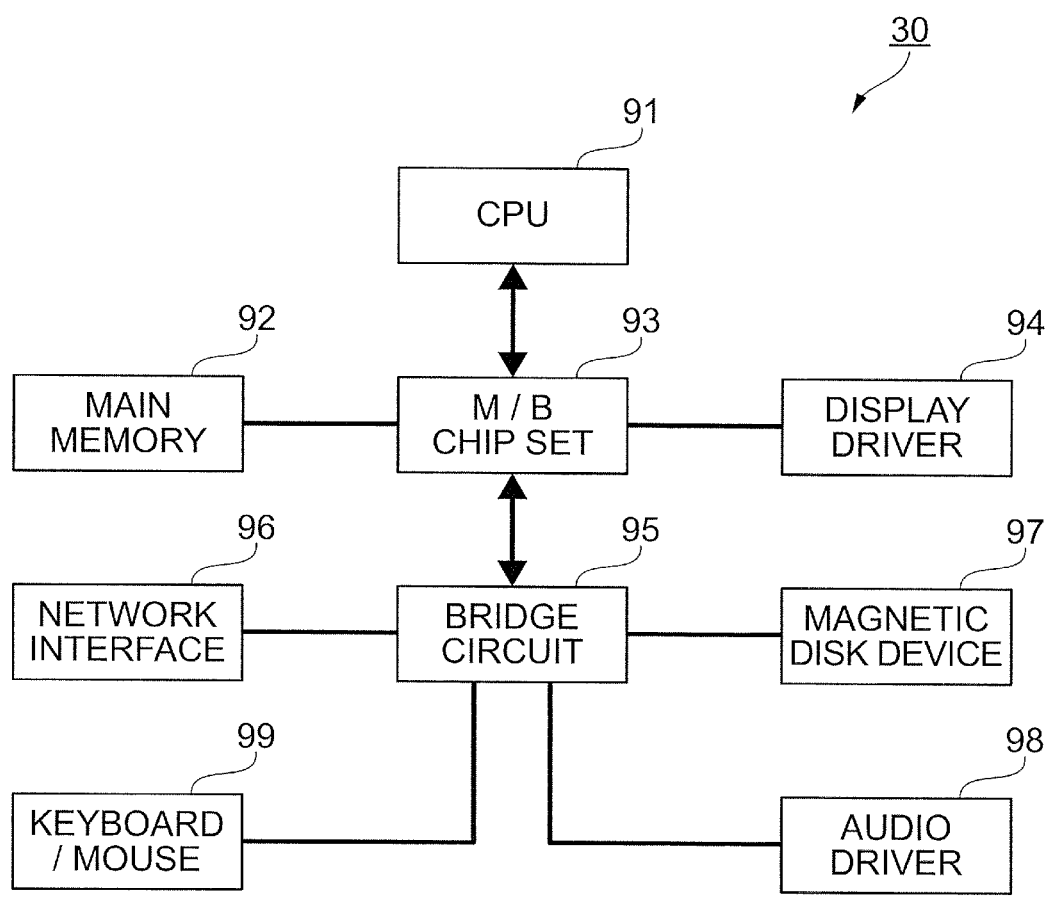
FIG. 2 depicts an example of a hardware configuration of a host device according to the preferred exemplary embodiment.

Referring to FIG. 2, there is shown an example of a hardware configuration of the host device 30 in the preferred exemplary embodiment. As shown in the figure, the host device 30 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, a magnetic disk device 97, an audio driver 98, and a keyboard/mouse 99 are also connected to the M/B chip set 93 via a bridge circuit 95.

In FIG. 2, the various configurational elements are connected via buses. For example, the CPU 91 and the M/B chip set 93, and the M/B chip set 93 and the main memory 92 are connected via CPU buses, respectively. Also, the M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. Also, when the network interface 96 is connected to the bridge circuit 95, a PCI Express may be used for the connection, for example. For connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

Next, an example will be described below where, upon update of a file, an index before the update is copied into an index after the update as metadata of another file in a reserved folder.

In this example, when the LTFS 32 is mounted on a drive L and a file "fileA" indicated by a path "L:¥folderA¥fileA" is updated, an index before updating is copied into an index after updating as metadata of a file "fileA.timestamp" indicated by a path "L¥.ltfs_file_history¥folderA¥fileA.timestamp". Note that the string "timestamp" may be set to a final update date and time of the file "fileA" before updating. Only the index is copied and the file itself is not copied. In this example, the file of a past version may be accessed by designating a path "L:¥.ltfs_file_history¥folderA¥fileA.*". The asterisk (*) may indicate an arbitrary date and time in the past.

Note that the final update date and time of the file "fileA" before updating serves as one example of identification information of the file "fileA" before updating. Although assumed to be associated with the identification information by being given a name including the identification information, the metadata may be associated with the identification information in other ways.

Figure 3A:
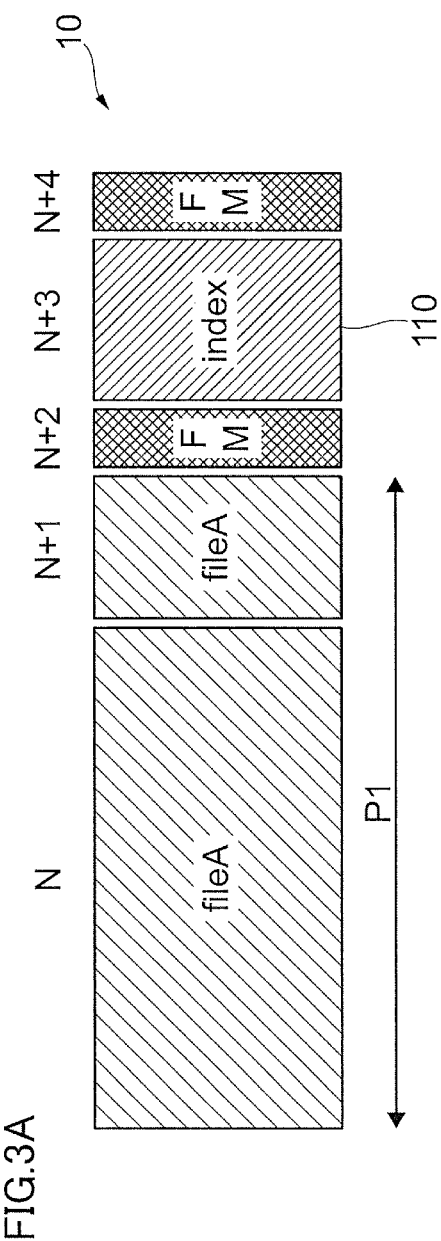
FIGS. 3A and 3B depict examples of recording states on a tape medium according to the preferred exemplary embodiment.
Figure 3B:
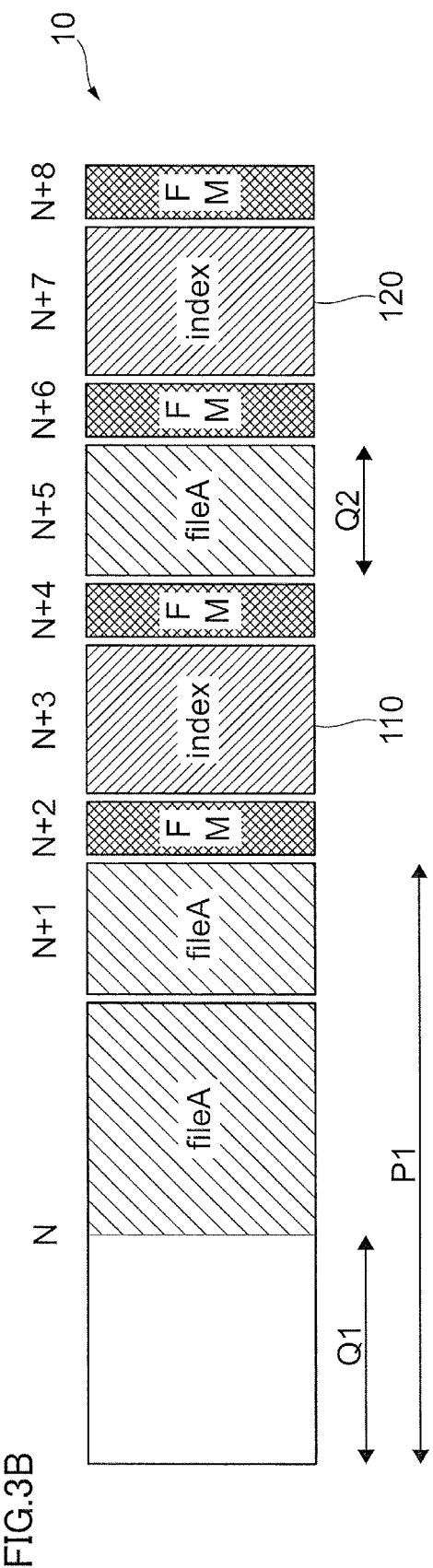

Referring to FIGS. 3A and 3B, there are shown examples of recording states on the tape medium 10. The tape medium 10 may include an index partition and a data partition. The index partition is mainly used to store an index for a quick access to the index. In each of the figures, however, the index partition is not shown, and the data partition is assumed to be used to store indices. The direction from left to right of each of the figures indicates a direction of writing data on the tape medium 10. In each of the figures, strings each starting with the letter "N" above the tape medium 10 indicate the numbers of blocks on the tape medium 10.

In FIG. 3A, the file "fileA" is assumed to be written to a region consisting of the blocks N and N+1. The size of the file "fileA" is assumed to be P1 bytes. The index 110 including metadata of the file "fileA" is assumed to be written to the block N+3. Note that, in the figure, filemarks (FMs) are assumed to be written to the blocks N+2 and N+4 sandwiching the block N+3 to which the index 110 has been written.

In FIG. 3B, the file "fileA" is assumed to be updated on the tape medium 10. Specifically, Q1 bytes of data from the beginning of the file "fileA" of an old version are assumed to be replaced by Q2 bytes of data. Then, the file "fileA" of a new version is assumed to be written to a region consisting of a part after the Q1-th byte of the block N, the block N+1 and the block N+5. The position and the length of the region are managed as a set of extents. One extent represents one continuous region on the tape medium 10. For example, the file "fileA" of a new version may be written to two extents. One of the two extents consists of a part after the Q1-th byte of the block N, and the block N+1. The other of the two extents consists of the block N+5. In addition to the index 110 including metadata of the file "fileA" of the old version, the index 120 including metadata of the file "fileA" of the old version and metadata of the file "fileA" of the new version is assumed to written to the block N+7. Note that, in the figure, filemarks (FMs) are assumed to be written to the blocks N+6 and N+8 sandwiching the block N+7 to which the index 120 has been written.

In this example, the newest index is assumed to be written to the data partition while keeping an older index on the data partition valid.

Note that, in the preferred exemplary embodiment, the same region on the tape medium 10 may be referenced from metadata of plural files in the index, for example, metadata of the file "fileA" and metadata of the file "fileA.timestamp". However, such reference is defined in a specification of the LTFS 32 as Shared Data. Thus, the preferred exemplary embodiment is accessible to any LTFS-compliant implementation irrespective of vendors who perform the implementation.

Referring to FIGS. 4A and 4B, there are shown examples of descriptions of indices. Note that, although the index is assumed to be described using an extensible markup language (XML), any language may be used to describe the index.

The description of FIG. 4A represents the index 110 written to the block N+3 in FIG. 3A.

The description 111 indicates metadata of the file "fileA". The description 111 may include date and time when the file "fileA" has been created, modified, or accessed, although it is not shown. Further, the description 111 may include the description 112, as shown in the figure. The description 112 indicates an extent of the file "fileA" consisting of the blocks N and N+1.

The description of FIG. 4B represents the index 120 written to the block N+7 in FIG. 3B.

The description 121 indicates metadata of the file "fileA" of the current version. The description 121 may include date and time when the file "fileA" of the current version has been created, modified, or accessed, although it is not shown. Further, the description 121 may include the descriptions 122 and 123, as shown in the figure. The description 122 indicates an extent of the file "fileA" of the current version consisting of the block N+5. The description 123 indicates an extent of the file "fileA" of the current version consisting of the part after the Q1-th byte of the block N, and the block N+1.

The description 131 indicates metadata of a folder ".ltfs_file_history". This folder is reserved for saving metadata of files of the past version. The description 132 indicates metadata of the file "fileA" of the past version. In this example, the past version is assumed to be a version of "10:10, Feb. 5, 2018". The description 132 may include date and time when the file "fileA" of the past version has been created, modified, or accessed, although it is not shown. Further, the description 132 includes the description 133, as shown in the figure. The description 133 indicates an extent of the file "fileA" of the past version consisting of the blocks N and N+1.

Note that the 'partition' element indicates a type of the partition on the tape medium 10 where the corresponding extent exists. The value 'b' of the 'partition' element indicates that the corresponding partition is a data partition. The 'startblock' element indicates the number of a block in which the corresponding extent starts. The 'byteoffset' element indicates an offset in the block from its beginning to a position at which the corresponding extent starts. The 'bytecount' element indicates the number of bytes of the corresponding extent. The 'fileoffset' element indicates an offset in the corresponding file from its beginning to a position at which the corresponding extent starts.

Next, operations of the LTFS 32 according to the preferred exemplary embodiment are described.

When the LTFS 32 writes a file newly to the tape medium 10, the file writing logic 321 may write the file to the tape medium 10. Specifically, the file writing logic 321 may send the file to the tape drive 20. Thus, the tape drive 20 may write the file additionally to the tape medium 10.

When the LTFS 32 updates a file of an old version on the tape medium 10, the file writing logic 321 may write the file of a new version to the tape medium 10 in such a manner that the file of the old version is updated by the file of the new version. Specifically, the file writing logic 321 may extract at least a part of the file of the new version which replaces at least a part of the file of the old version, and send, to the tape drive 20, the at least a part of the file of the new version and an instruction to prevent reference to the at least a part of the file of the old version. Thus, the tape drive 20 may, in response to the instruction, prevent the at least a part of the file of the old version from being referred to from an index of the file of the new version, and write the at least a part of the file of the new version additionally to the tape medium 10.

Meanwhile, the index writing logic 322 may write periodically an index to the tape medium 10, if necessary.

Figure 5:
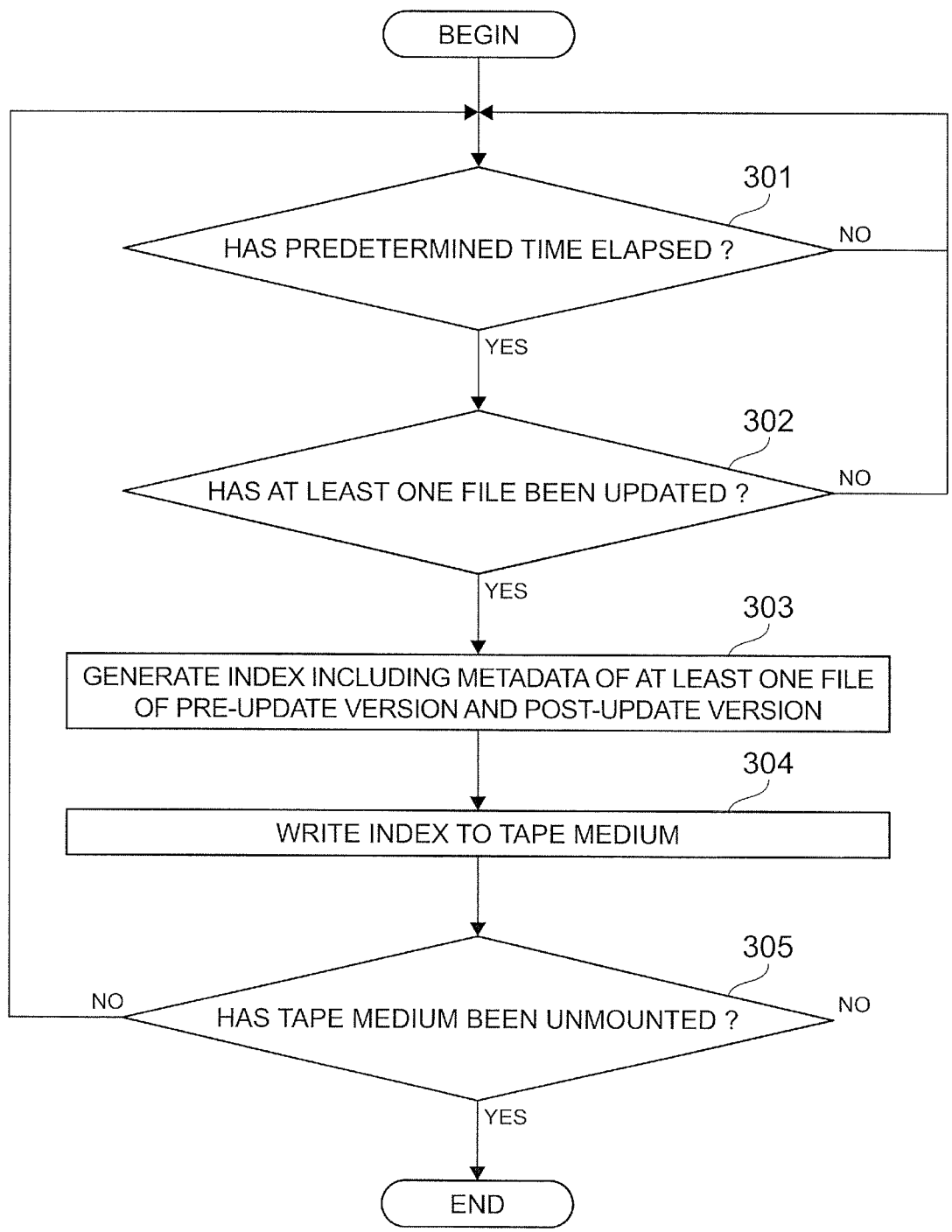
FIG. 5 depicts a flowchart representing an example of an operation of an index writing logic according to the preferred exemplary embodiment.

Referring to FIG. 5, there is shown a flowchart representing an example of the operation of the index writing logic 322. Note that this operation is assumed to be started in a state where the tape medium 10 is mounted, and the index writing logic 322 refers to an index including metadata of plural files on the tape medium 10.

First, the index writing logic 322 may determine whether or not a predetermined time has elapsed (step 301). If the predetermined time has not elapsed, the index writing logic 322 may repeat step 301 until the predetermined time has elapsed.

If, at step 301, the predetermined time has elapsed, the index writing logic 322 may determine whether or not at least one file out of the plural files has been updated (step 302). If no file has been updated, the index writing logic 322 may return the processing to step 301.

If, at step 302, at least one file has been updated, the index writing logic 322 may generate an index including metadata of the at least one file of a pre-update version and a post-update version (step 303). Then, the index writing logic 322 may write the index generated at step 303 to the tape medium 10 (step 304).

Subsequently, the index writing logic 322 may determine whether or not the tape medium 10 has been unmounted (step 305). If the tape medium 10 has not been unmounted, the index writing logic 322 may return processing to step 301. If, at step 305, the tape medium 10 has been unmounted, the index writing logic 322 may finish the processing.

After that, when the tape medium 10 is mounted again, the index reading logic 324 may first read the newest index from the tape medium 10. Specifically, the tape drive 20 may read the newest index from the tape medium 10 by an instruction of the index reading logic 324. Thus, the index reading logic 324 may receive the newest index from the tape drive 20.

Subsequently, when a user selects a file, the index reading logic 324 may analyze the newest index to obtain information about a folder including the file of the current version and a folder including the file of the past version. Thus, these two folders may be displayed on a display.

Figure 6:
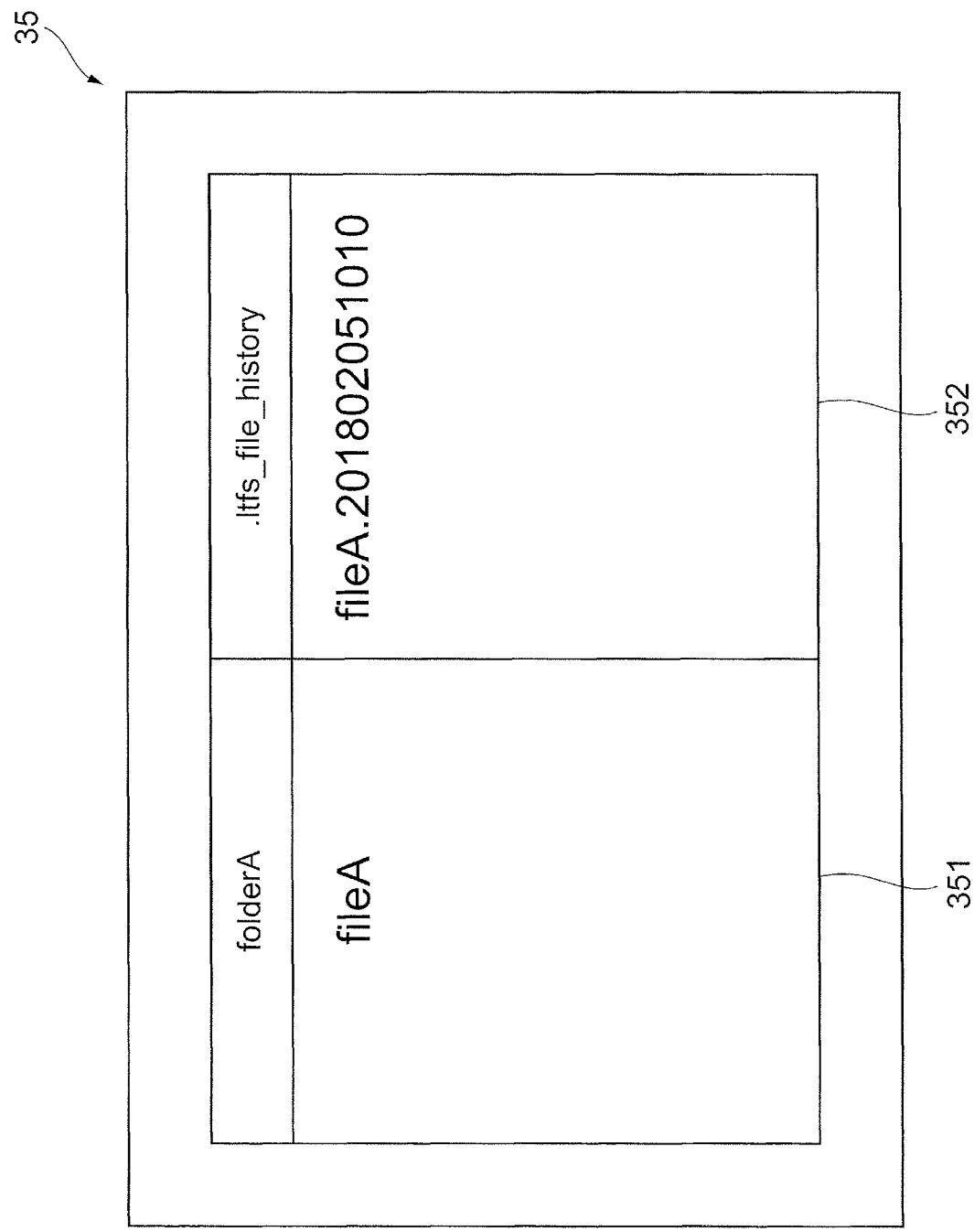
FIG. 6 depicts an example of a display of a file according to the preferred exemplary embodiment.

Referring to FIG. 6, there is shown an example of a display of these two folders.

As shown in the figure, the LTFS 32 may display a screen 35. The screen 35 may include an area 351 and an area 352. The area 351 may be used to display the folder "folderA" including the file "fileA" of the current version. The area 352 may be used to display the folder ".ltfs_file_history" including the file "fileA" of the past version, namely the file "fileA.201802051010".

After that, when the user selects the file "fileA" of the current version displayed in the area 351 or the file "fileA" of the past version displayed in the area 352, the index reading logic 324 may analyze the newest index to obtain a position of the selected file on the tape medium 10.

Then, the file reading logic 323 may read the selected file. Specifically, the tape drive 20 may read the selected file from the position on the tape medium 10 by an instruction of the file reading logic 323. Thus, the file reading logic 323 may receive the selected file from the tape drive 20.

Note that, although the folder ".ltfs_file_history" is assumed to include the file "fileA" of only one past version in the figure, the folder ".ltfs_file_history" may include the file "fileA" of plural past versions. In this case, plural file names each corresponding to the plural past versions may be listed in the area 352.

Thus, in the preferred exemplary embodiment, both the file of the current version and the file of the past version are accessed by referring to the newest index, without performing a rollback to an old index to access the file of the past version.

Next, an alternative exemplary embodiment will be described.

Although assumed to write an index to the tape medium 10 periodically in the preferred exemplary embodiment, the LTFS 32 may write the index to the tape medium 10 at an arbitrary timing. For example, the LTFS 32 may write the index to the tape medium 10 at a timing long after a file has been updated, such as a timing when the tape medium 10 is unmounted. However, in the alternative exemplary embodiment, the LTFS 32 is assumed to write the index to the tape medium 10 immediately after a file has been updated. In this case, the index is assumed to be written immediately after a position on the tape medium 10 where the file has been written. That is, the LTFS 32 may write the index including metadata of a file at an arbitrary timing after the file has been updated. The arbitrary timing may include a periodic timing and a timing immediately after the file has been updated.

Specifically, the block diagram of FIG. 1, the hardware configuration of FIG. 2, the recording states of FIGS. 3A and 3B, the descriptions of FIGS. 4A and 4B, and the display of FIG. 6 may be applied to the alternative exemplary embodiment. On the other hand, the flowchart of FIG. 5 is changed so that the index writing logic 322 starts immediately after a file is updated. In this case, the index writing logic 322 does not execute steps 301 and 302, generates the index including metadata of the file of a pre-update version and a post-update version at step 303, writes the index to the tape medium 10 at step 304, and does not execute step 305.

In the foregoing description, an explanation has been given regarding the case where, when a file is updated, an index including metadata of the file of a pre-update version and metadata of the file of the post-update version is written to the tape medium 10. However, the exemplary embodiments may be applied to the case where, when a file is deleted, an index not including metadata of the file is written to the tape medium 10.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for writing data to a tape medium, the method comprising:
    writing a file of a first content to the tape medium;
    writing a first index including first metadata to the tape medium, the first metadata being metadata of the file of the first content;
    writing at least a part of the file of a second content to the tape medium, the second content being obtained by updating the first content;
    writing a second index including the first metadata and second metadata to the tape medium, the second metadata being metadata of the file of the second content;
    reading the second index from the tape medium;
    retrieving, using only the second index, the file of the first content and the file of the second content;
    outputting for simultaneous display the file of the first content and the file of the second content;
    receiving selection of the displayed file of the first content; and
    analyzing the second index for obtaining a position of the file of the first content on the tape medium.

2. The method of claim 1, wherein the second index is written to the tape medium at an arbitrary timing after the at least a part of the file of the second content has been written to the tape medium.

3. The method of claim 2, wherein the arbitrary timing includes a periodic timing.

4. The method of claim 2, wherein the arbitrary timing includes a timing immediately after the at least a part of the file of the second content has been written to the tape medium.

5. The method of claim 1, wherein the first metadata is associated with identification information of the first content.

6. The method of claim 5, wherein the first metadata is associated with the identification information by being given a name including the identification information.

7. The method of claim 1, wherein
    the first index is written immediately after a position on the tape medium where the file of the first content has been written, and
    the second index is written immediately after a position on the tape medium where the at least a part of the file of the second content has been written.

8. The method of claim 1, further comprising reading the file of the first content from the tape medium using the position obtained from the second index.

9. The method of claim 1, wherein both the file of the first content and the file of the second content are accessed by referring to the second index, without performing a rollback to the first index to access the file of the first content.

10. The method of claim 1, wherein the file of the first content is a past version of the file of the second content, wherein a file of a third content is a prior version of the file of the first content; and comprising outputting for simultaneous display the file of the first content, the file of the second content, and the file of the third content.

11. An apparatus for writing data to a tape medium, the apparatus comprising:
    a processor; and
    a memory coupled to the processor, wherein the memory comprises program instructions executable by the processor to cause the processor to perform a method comprising:
        writing a file of a first content to the tape medium;
        writing a first index including first metadata to the tape medium, the first metadata being metadata of the file of the first content,
        writing at least a part of the file of a second content to the tape medium, the second content being obtained by updating the first content;
        writing a second index including the first metadata and second metadata to the tape medium, the second metadata being metadata of the file of the second content;
        reading the second index from the tape medium;
        retrieving, using only the second index, the file of the first content and the file of the second content;
        outputting for simultaneous display the file of the first content and the file of the second content;
        receiving selection of the displayed file of the first content; and
    analyzing the second index for obtaining a position of the file of the first content on the tape medium.

12. The apparatus of claim 11, wherein the second index is written to the tape medium at an arbitrary timing after the at least a part of the file of the second content has been written to the tape medium.

13. The apparatus of claim 12, wherein the arbitrary timing includes a periodic timing.

14. The apparatus of claim 12, wherein the arbitrary timing includes a timing immediately after the at least a part of the file of the second content has been written to the tape medium.

15. The apparatus of claim 11, wherein the first metadata is associated with identification information of the first content.

16. The apparatus of claim 15, wherein the first metadata is associated with the identification information by being given a name including the identification information.

17. The apparatus of claim 11, wherein the first index is written immediately after a position on the tape medium where the file of the first content has been written, and the second index is written immediately after a position on the tape medium where the at least a part of the file of the second content has been written.

18. The apparatus of claim 11, further comprising reading the file of the first content from the tape medium using the position obtained from the second index.

19. The apparatus of claim 11, wherein both the file of the first content and the file of the second content are accessed by referring to the second index, without performing a rollback to the first index to access the file of the first content, wherein the file of the first content is a past version of the file of the second content, wherein a file of a third content is a prior version of the file of the first content; and comprising outputting for simultaneous display the file of the first content, the file of the second content, and the file of the third content.

20. A computer program product for writing data to a tape medium, the computer program product comprising a computer readable storage medium having program instructions embodied therewith, the program instructions executable by a computer to cause the computer to perform a method comprising:

writing a file of a first content to the tape medium;

writing a first index including first metadata to the tape medium, the first metadata being metadata of the file of the first content;

writing at least a part of the file of a second content to the tape medium, the second content being obtained by updating the first content;

writing a second index including the first metadata and second metadata to the tape medium, the second metadata being metadata of the file of the second content;

reading the second index from the tape medium;

retrieving, using only the second index, the file of the first content and the file of the second content;

outputting for simultaneous display the file of the first content and the file of the second content;

receiving selection of the displayed file of the first content; and analyzing the second index for obtaining a position of the file of the first content on the tape medium.

* * * * *